INVENTORS
FREDRICK P. EVANS
LLOYD C. WHITE
BY Vernon F. Hauschild
ATTORNEY

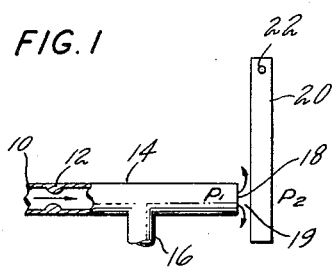
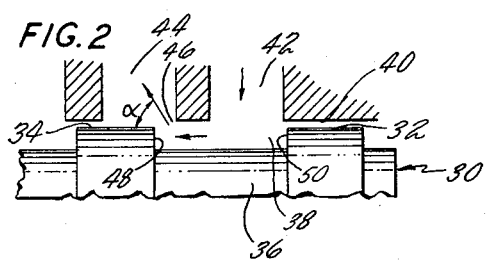
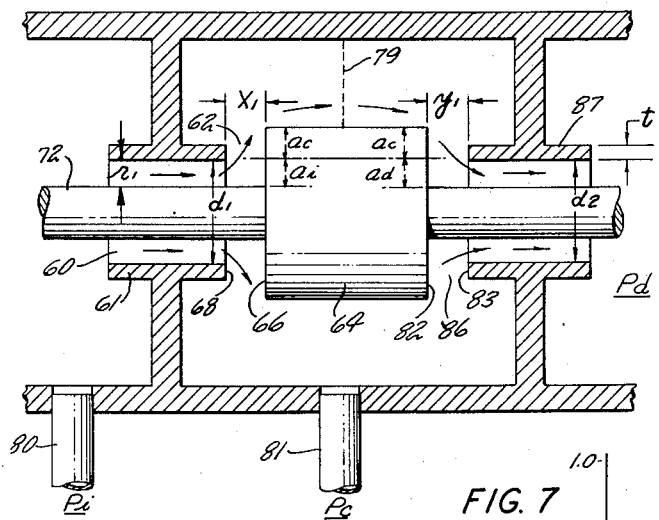
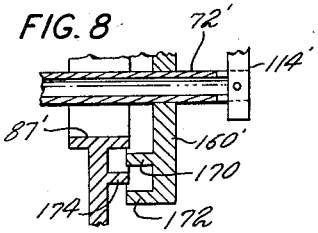
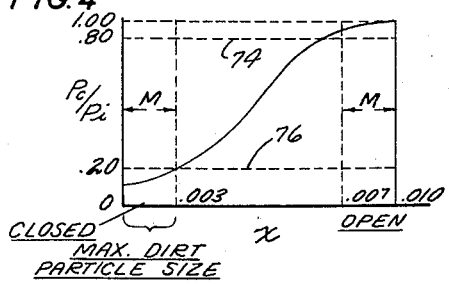
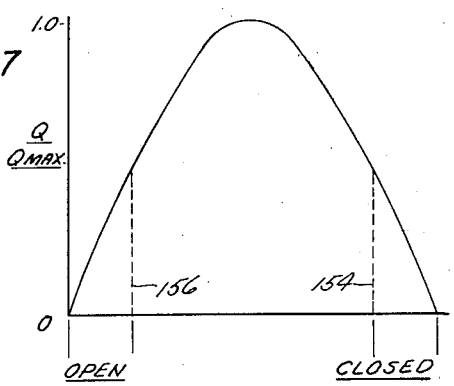
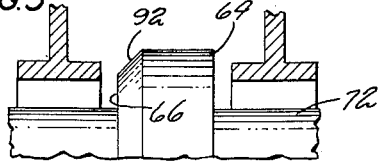
INVENTORS
FREDRICK P. EVANS
LLOYD C. WHITE

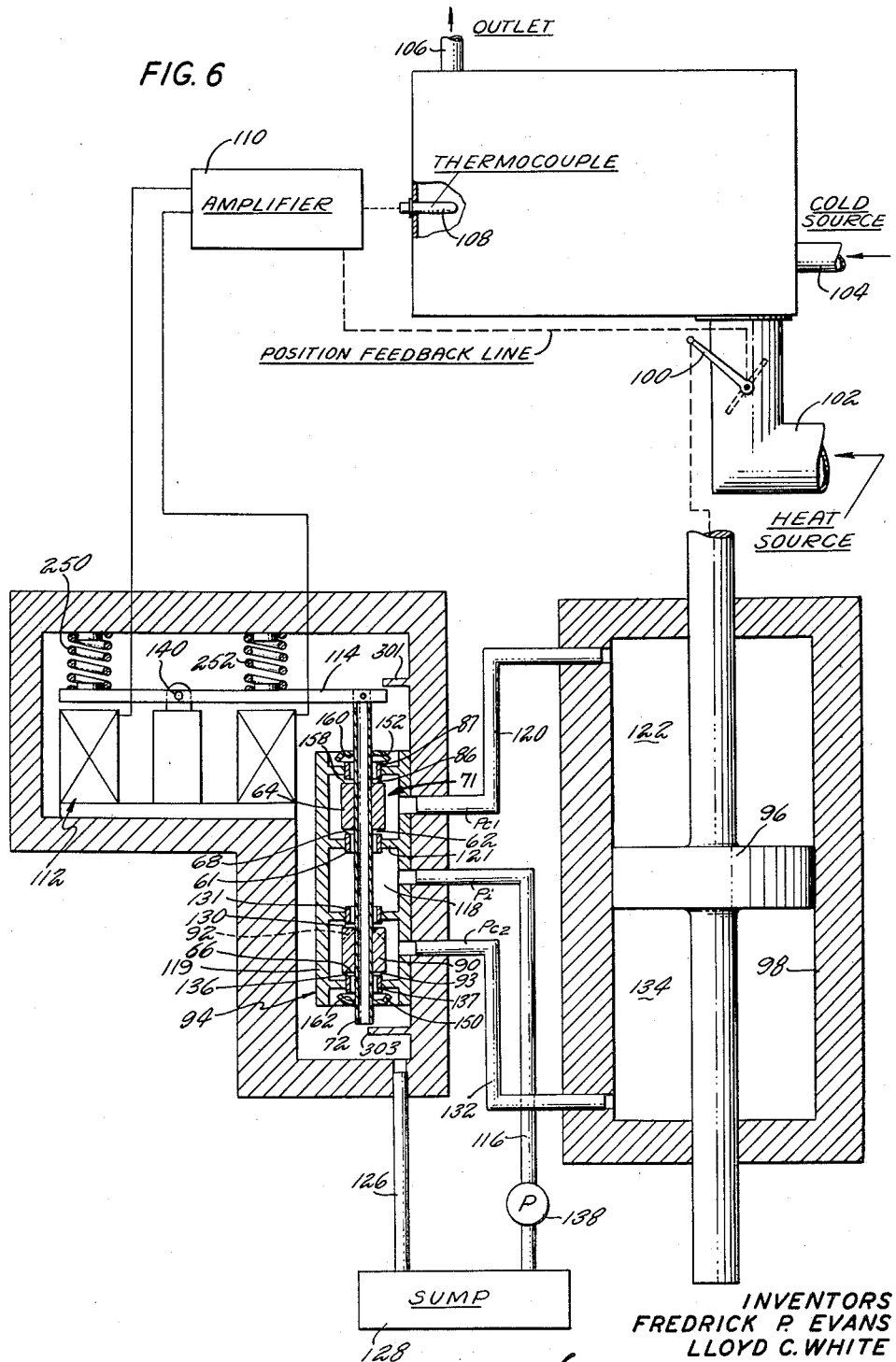

United States Patent Office 2,912,010
Patented Nov. 10, 1959

2,912,010

FRICTIONLESSLY MOUNTED FLUID POPPET VALVE WITH BALANCED DYNAMIC FLUID FORCES AND STATIC PRESSURE FORCES

Fredrick P. Evans, Longmeadow, Mass., and Lloyd C. White, Cincinnati, Ohio, assignors to United Aircraft Corporation, East Hartford, Conn., a corporation of Delaware Application June 4, 1957, Serial No. 665,620

10 Claims. (Cl. 137—623)

This invention relates to valves and more particularly to balanced valves of the type used as hydraulic-servo controlling valves. It is an object of our invention to provide a valve which is completely balanced, that is, unaffected by fluid forces acting thereon, that is, the forces produced incident to the flow of fluid through the valve.

It is a further object of our invention to provide a valve which is capable of "position control," that is, of maintaining its adjusted position in view of the fact that it is unaffected by forces of the controlled fluid acting thereon.

It is a further object of our invention to provide a valve which is capable of accomplishing "gain compensation," that is, to have the ability to create full momentum forces to move the valve in the proper direction and the proper amount to accommodate changes in the required fluid flow rate to servo or actuator piston being controlled by the valve.

It is a further object of this invention to provide a valve having "gain control," that is, to have the ability of increasing pressure sensitivity of the valves to the highest level commensurate with fluid filtration.

It is a further object of this invention to provide a valve having the attribute of "leakage control," that is, the ability to control the amount of fluid flow which goes to drain and is not utilized to power the servo.

It is a further object of this invention to provide a valve having "integrating rate control," that is, a valve having a desired maximum integrating rate.

It is still a further object of this invention to provide a valve which is "temperature compensated."

It is still a further object of this invention to provide a valve capable of effecting "pressure regulation."

It is still a further object of this invention to provide a valve capable of effecting "flow control" such that it may be used as a fluid valve.

It is a further object of this invention to provide a valve which is density sensitive such that it may either be used as a densimeter or be used in a fluid system capable of hnadling fluid of different densities.

It is a still further object of this invention to provide a valve which is "viscosity sensitive," that is, which may either be used as a viscosimeter or be sensitive to react with sensitivity to viscosity variations.

It is a most important feature of this invention to teach a valve which has the desirable attributes of both a spool and a flapper valve, such as the high pressure sensitivity ($dp/dx$) and the gain compensation of a spool valve while eliminating concentricity and filtration problems encountered in spool valve fabrication and operation. Our valve further attains the flapper valve advantages of no friction loss, full closing ability, dirt livability, 90° efflux angle and freedom from changes in momentum forces while eliminating the flapper valve's problems of sensitivity to pressure drop and the problem of static pressure increase as the valve fully closed position is approached.

Other and further objects and advantages will be apparent from the following specification and the attached drawings in which:

Fig. 1 is a representation of a typical flapper valve and is included for illustration purposes solely and does not form a part of the present invention.

Fig. 2 is a representation of a typical spool valve and is included for illustration purposes solely and does not form a part of the present invention.

Fig. 3 represents a partial showing of the valve taught herein illustrating certain spool and flapper valve advantages attained thereby.

Fig. 4 is a graph plotting pressure variation against valve travel for a valve metering block and its associated nozzles as shown in Fig. 3.

Fig. 5 is a fragmentary representation of the valve taught herein to illustrate a gain compensation feature.

Fig. 6 is a representation of a practical embodiment of this invention used to actuate a double-acting servo or actuating piston.

Fig. 7 is a graphic representation of valve flow through our balanced valve of the type illustrated in Fig. 6 when the servo piston of the type illustrated in Fig. 6 is quiescent.

Fig. 8 is a representation of a plural flow reverser which may be used with our balanced poppet valve shown in Fig. 6 to attain gain compensation.

Figure 9:
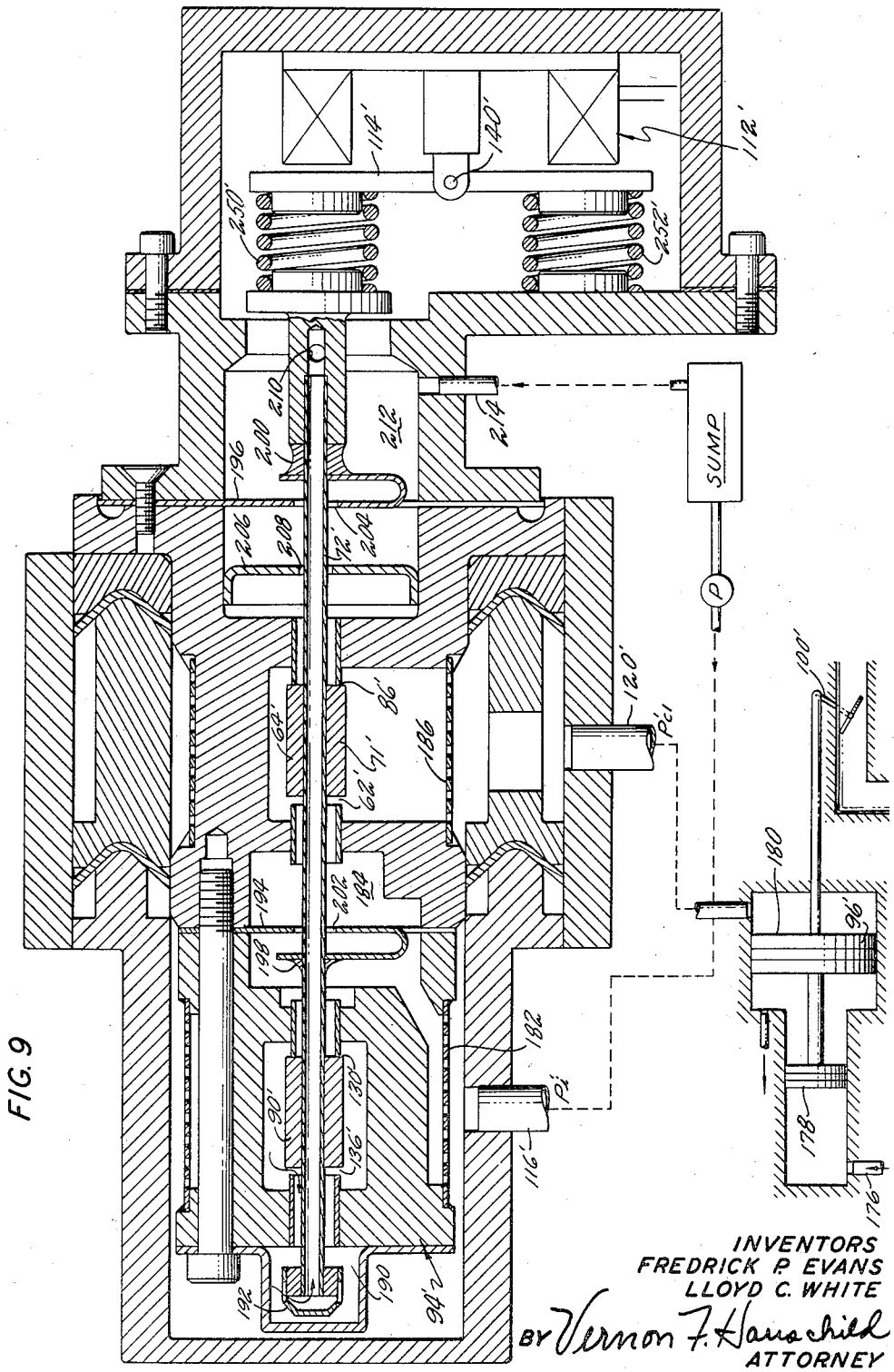
Fig. 9 is a representation of the valve taught herein used to actuate a single-acting servo piston.

In the past, both spool and flapper type valves have been used for servos and while each has merit, each also has its disadvantages. The spool type valve has the advantage of permitting greater valve pressure sensitivity through use of close diametrical clearances, but the end pressures achieved cannot be 100% of the available supply head nor completely down to the drain head, and it is subject to the problems of friction associated with close clearances and sliding surfaces. The flapper valve can be positioned to reduce the fluid flow to zero, but its position is highly sensitive because of system resilience to the fluctuations of supply and/or drain pressures.

As stated, supra, it is an object of this invention to provide a servo valve which combines the advantages and eliminates the disadvantages of both the spool and flapper type valve. The invention taught herein lies in a frictionlessly mounted fluid poppet valve with balanced dynamic fluid forces and static pressure forces which may be fabricated to be sensitive or responsive to fluid operating characteristics such as viscosity and density and which, when used as a servo valve in combination with a hydraulic piston-cylinder motor, gives the benefit of hydraulic piston position control, gain compensation, leakage control, rate control, and poppet valve dirt clearance control.

Fig. 1 will be used purely to explain the functioning of our valve construction shown partially in Fig. 3 and the relation thereof to a flapper valve. Referring to Fig. 1, we see a typical flapper type valve in which the fluid passes through conduit 10, through fixed orifice 12 and then into conduit 14 where it junctions with fluid from conduit 16. The fluid then passes through orifice 18, and the curtain area 19, the size of which is governed by the position of flapper or beam 20. Flapper 20 is pivotable about pivot point 22. It will be noted that the flapper valve may be closed off fully by causing flapper 20 to bear against the walls of orifice 18, decreasing curtain area 19 to zero. It will further be noticed that the position of flapper 20 is highly sensitive to the pressure drop across the valve, that is, $P_1$ minus $P_2$, if the actuating system is not rigid.

Fig. 2 will be used purely to explain the functioning of our valve construction shown partially in Fig. 3 and the relation thereof to a spool valve. Referring to Fig. 2, we see a typical spool valve including spool 30 which is positioned by an external source (not shown) and comprises lands 32 and 34 projecting from the spool body 36 to form groove 38 therebetween. Spool 30 is carried within fixed passage 40 which has inlet conduit 42 and outlet conduit 44 therein. Fluid enters groove 38 radially from inlet conduit 42 and is discharged into outlet conduit 44 through metering orifice 46. Force balance occurs in a spool valve since the pressures acting against surfaces 48 and 50 are substantially the same. A degree of unbalance is introduced when the fluid is accelerated to pass through orifice 46 thereby leaving a reduced pressure area at the outer extremity of wall 48 to give spool 30 a component of movement toward the right or valve closed position as viewed in Fig. 2. In a spool valve of this type, the angle of efflux $\alpha$ is roughly 69° and a conversion of potential energy (pressure) to kinetic energy (velocity) is required to accelerate the fluid. This conversion takes place before orifice 46 thereby causing the pressure reduction to be effective along the outer portion of wall 48.

Fig. 3 depicts a single metering block of our valve (complete valve embodiment shown in Figs. 6 and 9) to show how the features of the spool and flapper valves have been incorporated. Fluid enters through conduit 80 at pressure $P_i$ and then passes through nozzle 60 and metering orifice 62 around metering block 64 and then passes either through conduit 81 at control pressure $P_c$ or passes through metering orifice 86 and nozzle 87 to drain. The flow through annulus 60 corresponds to spool valve functioning while the flow through upstream metering orifice 62 corresponds to flapper valve operation with metering block 64 acting as the flapper. The valve portion shown in Fig. 3 has the flapper valve advantage of being able to reduce fluid flow to zero by causing surface 66 of metering block 64 to bear against valve seat surface 68. To give our valve high pressure sensitivity, $dp/dx$ where $p$ equals pressure and $x$ equals the travel of metering block 64, we would reduce distances $X_1$ and $Y_1$ to a minimum and thereby gain the advantage of a spool valve. This would be practical, however, beyond a prescribed minimum only in installations where dirt and other foreign matter are not a problem.

Referring to Fig. 4, we see a graph of control pressure $(P_c)$ over inlet pressure $(P_i)$ plotted against X which is the distance from the metering block face 66 (Fig. 3) to the valve seat 68. There are minimum values of X, and the similar distance Y, which are required to allow sufficient clearance M at each end of the valve travel to permit the passage of the largest dirt or other foreign matter particle. We observe that the usable pressure ratio limits of our valve lie between pressure ratio lines 74 and 76. Our experience has shown that if the maximum dirt particles limits M are chosen to be .003 inch, then the maximum travel or dimension X could be .010 inch, but our teaching is not necessarily so limited. Our valve may be controlled so that the dirt particle clearance M is not reduced to a dimension below the desired minimum, such as .003 inch, by making the area of servo piston 96, described in connection with Fig. 6, sufficiently large that the necessary servo force can be obtained with a small servo valve movement. In this way, reducing the size of any metering orifice, such as 62 and 86 in Fig. 3, below .003 inch is not necessary during normal operation. However, with our valve arrangement, the .003 inch dimension minimum may be disregarded or overruled during emergency conditions, such as servo piston 96 jamming, when maximum servo forces are needed. Also, positive stops, such as 301 and 303 of Fig. 6, could be used to so limit the valve travel to insure the desired dimension minimum. Our experience has shown further that where the .003 inch maximum dirt particle size is chosen with the .010 inch total valve travel, 20% ΔP exists at line 76, whereas 80% ΔP exists at line 74 so that it will be seen that we gain the advantage of 60% ΔP or working power in .004 inch of valve travel.

Valve position in a resilient system can only be held constant if there is no force change on the valve. Our valve achieves force equilibrium in spite of fluctuations in static pressures and momentum forces attendant to flow changes. The fluid is caused to enter conduit 80 at $P_i$, in Fig. 3, pass through annulus 60 and act against surface 66 of metering block 64 as it passes through upstream metering orifice 62 and then act against surface 82 of metering block 64 as it passes through downstream metering orifice 86 en route to be discharged through nozzle 87. It will be noted that since substantial portions $(a_c)$ of both surfaces 66 and 82 of metering block 64 are subjected to control pressure $P_c$, the only force unbalance acting upon metering block 64, is the difference between the drain pressure $P_d$ and the inlet pressure $P_i$ acting on similar surfaces $a_d$ and $a_i$ of metering block 64. This unbalance will be compensated by an equal and opposite force acting upon a second metering block 90 on tube 72, shown in Fig. 6.

It will be noted with reference to Fig. 3 that metering block 64 projects radially beyond nozzle 61, such that the angle of efflux of the fluid passing between nozzle 61 and metering block 64, which define metering orifice 62, is substantially 90°, therefore there is no axial force due to fluid acceleration because the acceleration is entirely radial as shown by the 90° efflux angle, therefore, there is no force exerted by the effluxing fluid tending to cause movement of metering block 64 to a valve closed or open position. This is a highly desirable feature in installations where it is required that metering block 64 remain in a constant position. The force on face 66 brought about by the axial deceleration of the fluid prior to radial efflux is compensated by a similar acceleration force on face 82. With respect to physical dimension, it has already been pointed out that to achieve substantially a ninety (90°) degree fluid efflux angle through a metering orifice such as 62, it is necessary to have the surface 66 of metering block 64 extend radially beyond nozzle ring 61 a substantial amount. As a radial overhang is decreased, the angle of efflux will decrease toward the sixty-nine (69°) degree angle attained in spool valve operation, in fact, it could be reduced to an angle below sixty-nine (69°) degrees by further reducing the radial dimension of surface 66. By way of further dimensional experience gained, it is desirable that the wall thickness $t$ of nozzles 61 and 87 of Fig. 3 be maintained to a very thin dimension, such as .005 inch, such that a pressure variation is not built up on the radial faces such as surfaces 63 and 83 to tend to move metering block 64, thereby disturb its balance. Further, it is important that the inner diametrical dimension of all nozzle rings, such as 61 and 87 be the same such that dimensions $d_1$ and $d_2$ be equal to permit valve balance. It is also desirable that the radial clearance $r_1$ between nozzle ring 61 and tube 72 be larger than the total travel of metering block 64 to insure that $r_1$ not provide a restriction to flow affecting the operation on metering orifice 62. By way of dimension, it will further be observed that metering blocks 64 and 90, shown in Fig. 6, must be so spaced that when metering block 90 bears against valve seat 93, metering block 64 will bear against valve seat 68, and in the same manner, when metering block 90 bears against nozzle ring 131, metering block 64 will bear against nozzle ring 87.

Again referring to Fig. 3, it will be noted that the fluid flow is from upstream metering orifice 62, around metering block 64 and then through downstream metering orifice 86. It will be recalled that in discussing a typical spool valve, supra, that the sixty-nine (69°) degree fluid angle of efflux was said to result in forces tending to close the valve, that is, reduce dimension $X_1$ and increase the dimension $Y_1$. We therefore note that due to the 69° angle of efflux in a spool valve, the valve tends to close while, due to a 90° angle of efflux in the valve shown in Fig. 3, the valve is balanced.

Before leaving our consideration of Fig. 3, it should be pointed out that rod 72 serves the purpose of frictionlessly suspending metering block 64 between nozzles 61 and 87 and that our valve could operate as well if we were to remove rod 72 and suspend metering block 64 from a string or spring 79 shown in phantom in Fig. 3.

Referring to Fig. 6, we see a practical embodiment of our invention in which servo valve unit 94, which comprises housing 119, lateral walls 121, nozzles 87, 61, 131 and 137, rod 72 and metering blocks 64 and 90, is used to control the position of a double-acting piston or actuator 96 within hydraulic cylinder 98 to control the position of throttle valve 100 located in heat source conduit 102 such that when it mixes with fluid from cold source conduit 104, the temperature transmitted through outlet conduit 106 is substantially constant. This is accomplished by utilizing thermocouple 108 to read and detect temperature error from the desired temperature, possibly by comparing the temperature sensed with a standard, and to transmit this temperature error through amplifier 110 to solenoid unit 112 so as to actuate lever 114 to move rod 72 of valve unit 94 to reposition double-acting piston or actuator 96 to adjust the position of throttle 100 to compensate for the temperature error. Solenoid unit 112 is fully described in United States Patent Nos. 2,579,723 and 2,752,891 to which reference is hereby made.

Actuator 96 is caused to move or be held in quiescence by passing fluid at pressure $P_1$, supplied by pump 138, through conduit 116 into chamber 118 of valve housing 119 of servo valve unit 94 from whence it passes through two different routes and in quantities determined by the position of floating valve unit 71 as positioned by lever 114 of solenoid unit 112. Floating poppet valve unit 71 comprises rod 72 and metering blocks 64 and 90 as flow reversers 150 and 152 will be disregarded for the moment. The first of these routes will be through metering orifice 62 and around metering block 64 from whence it will pass either through conduit 120 at control pressure $P_{c1}$ into chamber or cavity 122 on one side of actuator piston 96 or through downstream metering orifice 86 from whence it will pass to drain line 126 and into sump 128. The other path through which fluid will flow from chamber 118 is through metering orifice 130 and around metering block 90 and thence either through conduit 132 at control pressure $P_{c2}$ into chamber or cavity 134 on the opposite side of actuator piston 96 from chamber 122 or through downstream metering orifice 136 then through scavenge line 126 to sump 128. The fluid accumulating in sump 128 will be pumped by pump 138 through line 116 at pressure $P_1$ into chamber 118 as needed to perpetuate this controlling function.

Our valve is capable of compensating for leakage across actuator piston 96 and this will be described with reference to the showing of Fig. 6. With actuator piston 96 quiescent, the flows through orifices 62 and 136 are equal while the flows through orifices 130 and 86 are equal. When leakage occurs across actuator piston 96, for example, from cavity 134 to cavity 122, the instantaneous flow through orifice 130 is greater than the flow through orifice 62 so that the momentum force increase acting on metering block 90 and the reaction force increase caused by fluid axial deceleration acting on metering block 64 tend to move floating valve unit 71 in a direction to rotate bar 114 in a clockwise direction and increase the flow through metering orifice 130, thereby increasing the flow to cavity 134 to compensate for the flow leakage.

It is a characteristic of solenoid unit 112 that it will impart a force through lever 114 proportional to the error sensed, for instance by thermocouple 108. This force moves floating valve unit 71 to different positions proportional to this force, such that actuator piston 96 will move approximately 63% of the total motion required in the same time interval regardless of error magnitude. Actuator piston 96 will move at a different initial velocity when compensating for a 50° temperature error than when compensating for a 10° temperature error such that the time which would elapse for actuator piston 96 to arrive at its new position based on this initial velocity is the same in either case, which means that it travels at different velocities to correct errors of different magnitudes. In short, the time constant of the system is left invariant.

It is highly desirable that the time constant of actuator piston 96 remain unchanged during a given error compensation regardless of the load thereon or the resistance offered to motion. This resistance to motion could be, for example, friction encountered in moving throttle valve 100 or resistance encountered in attempting to further compress a spring or any such substance. This ability to maintain the unchanged time constant of actuator piston 96 regardless of the load thereon is known as gain compensation.

To illustrate the actuation of servo valve 94 and to show its gain compensation characteristics, reference will be made to Fig. 6, and thermocouple 108 will be considered to read a temperature in excess of the desired temperature such that throttle valves 100 must be closed a predetermined amount to reduce the temperature at outlet 106 to the desired reading. To close off throttle valve 100, actuator valve 96 must move toward valve 100 and reduce the volume in chamber 122 and increase the volume in chamber 134. This movement is accomplished by amplifying the positive temperature error sensed by probe 108 and transmitting the error, so amplified, to solenoid unit 112 which causes lever 114 to rotate about fulcrum 140 in a clockwise direction to move floating valve unit 71 of servo valve 94 in a downward direction, that is, toward sump 128, as shown in Fig. 6. With floating valve 71 in this new position, the metering orifice 130 between metering block 90 and nozzle 131 is increased, while the metering orifice 136 between metering block 90 and nozzle 137 is decreased so that there is a greater resistance to flow through orifice 136 such that pressure $P_{c2}$ increases to an amount closer to pressure $P_1$ to subject cavity 134 to a higher pressure. This new position of floating valve 71 also decreases metering orifice 62 between nozzle 61 and metering block 64 while it increases metering orifice 86 between nozzle 87 and metering block 64 such that less resistance is now offered to fluid flow through metering orifice 86 to reduce pressure $P_{c1}$ and subject cavity 122 to a reduced pressure. The resulting pressure unbalance across the piston 96 will accelerate the piston in the direction to close throttle valve 100. A terminal velocity is soon reached. This velocity limit is established when the pressure $P_{c1}$ caused by the piston 96 sweeping fluid from chamber 122 through metering orifice 86 is at the correct amount to provide a pressure drop across the piston 96 just adequate to overcome the resistive force such as friction and valve 100 aerodynamic torque. The equilibrium pressure $P_{c2}$ at this terminal velocity is established in a similar manner.

Let us presume that in moving to close throttle valve 100, actuator piston 96 encountered loads due to the aerodynamic forces acting on throttle valve 100 such that resistance to closing increases as the fully closed throttle valve position is approached. Under these circumstances, the increased load imposed upon actuator valve 96 will cause actuator valve 96 to reduce its velocity which will increase pressure $P_{c2}$ and decrease pressure $P_{c1}$ to reduce the pressure drop $P_1$—$P_{c2}$ across metering orifice 130 and increase the pressure drop $P_1$—$P_{c1}$ across metering orifice 62 which will reduce the fluid flow to cavity 134 and increase the flow to cavity 122 and thereby further reduce the velocity of actuator valve 96. In short, the reduction in velocity of actuator piston 96 caused by imposing a greater load thereon reduces the pressure drop across the metering orifice which is providing fluid to move actuator piston 96 and thereby further reduces its velocity.

This is completely contradictory to the desirable gain compensation result described previously in which we wish to have the velocity of actuator valve 96 remain constant regardless of the load imposed thereon. Let us suppose that our metering block 99 had been fabricated to have beveled surface 92 therein, as best illustrated in Fig. 5, such that we effect an angle of efflux less than 90°, similar to the 69° of a spool valve. Under these circumstances, the pressure drop placed on surface 92 as a result of fluid discharge through the valve would cause the floating valve unit 71 of valve 94 to tend to close with increasing force as the fluid flow through the valve increased. Now, when an added load is imposed upon actuator piston 96 to tend to reduce its velocity, the reduction in flow through metering orifice 130 caused thereby, as explained supra, will have the effect of reducing the tendency to close the valve so that the error signal is able to open the valve against diminished resistance.

The greater valve opening results in nearly the same fluid flow to the actuator piston chamber 134 at the higher $P_{c2}$ level. This effect is to tend to maintain a fixed velocity of the actuator piston regardless of load.

It has been demonstrated supra how gain compensation can be accomplished in our valve by utilizing controlled momentum forces which depend upon the fluid angle of efflux. This angle is established by beveled surfaces such as 92 on the metering blocks. To this point we have considered the floating valve unit 71 of servo valve 94 as if flow reversers 150 and 152 were not attached thereto. It will now be demonstrated how gain compensation may be obtained by using flow reversers 150 and 152. If actuator piston 96 is quiescent, then the valve flow through orifices 86 and 136 is the same. This is illustrated in Fig. 7 in which, for a quiescent regulating piston 96, the ratio of the flow to its maximum value is plotted against valve position between the valve open and close positions. Still referring to Fig. 7, consider that metering block 64 of Fig. 6 is flush against valve seat surface 68 of nozzle 61, then, since there is no flow through nozzle 61, there can be no flow through orifice 86. As metering block 64 is moved away from surface 68 of metering orifice 62, the valve flow gradually increases until it reaches maximum when the areas of metering orifice 62 and metering orifice 86 are equal. The flow gradually reduces as metering block 64 decreases orifice 86 and the flow ceases when the metering block 64 abuts nozzle 87. Metering block 90 will be doing just the opposite. It will be noted, as best shown in Fig. 6, that the closed position of metering orifice 62 is obtained with the full open position of metering orifice 130, and that the open position of 86 is obtained when metering orifice 136 is closed. At both full open and full close positions, as shown in Fig. 7, the flow is zero. Metering block 64 moves away from nozzle 61 at the same rate that metering block 90 moves away from nozzle 137 such that the plot line illustrated in Fig. 7 is symbolic of bypass flow for each of these valves since they follow the same plot line but their plot directions are different. Let us consider that one of the valves is at position 154 of Fig. 7, then the other valve must be at position 156, at which positions the flow through each is equal. The equal flow produces equal and opposite momentum effects on floating valve 71 of valve unit 94. Considering the downstream metering orifice 136, whose characteristics are similar to those of downstream metering orifice 86, the pressure of the fluid passing therethrough is acting against equal areas 66 of metering block 90 and 162 of the flow reverser 150 so that the only force tending to move floating valve 71 and hence metering blocks 64 and 90 is the force imposed thereon by reversing the fluid flow substantially 180° as it passes through flow reversers 150 and 152. Since the quantity of flow through metering orifices 86 and 136 is equal, these flow reversal forces will be equal and cancelling, hence with actuator piston 96 quiescent, servo valve 94 is in balance and all forces acting thereon are cancelled by equal and opposite forces in the manner just described.

Now, let us consider actuator piston 96 moving so as to close throttle valve 100 by increasing the size of cavity 134 and reducing the size of cavity 122. Under these circumstances, due to the fluid sweeping action of piston 96, the flow through metering orifice 86 is greater than the flow through metering orifice 136 and, therefore, since pressure balance exists between areas 158 of metering block 64 and 160 of flow reverser 152 and areas 66 of metering block 90 and 162 of flow reverser 150, the increased flow through orifice 86 and the decreased flow through orifice 136 causes the 180° flow reversing or rotation at flow reverser 152 to impose an increased force on valve 71 tending to rotate lever 144 in a counterclockwise direction while the reduced reaction force caused by flow reverser 150 has a similar rotational effect on lever 144. If we now increase the load on piston 96, the velocity of the piston 96 will tend to drop thereby reducing the pressure $P_{c1}$ while increasing the pressure $P_{c2}$ to increase the flow through orifice 136 such that floating valve unit 71 moves to increase the area of the metering orifice 130. This action increases the flow to cavity 134 and decreases the flow to cavity 122 and thereby compensates for the reduction in the velocity of actuator piston 96 caused by the increased load. In this fashion, flow reversers such as 150 and 152 can be utilized to accomplish gain compensation. It should be noted, as shown in Fig. 8, that it is possible to increase the effect of the flow reversers by providing a double cup arrangement in which flow reverser 150′ is shown to have two flow reversing lips 170 and 172, which, in cooperation with nozzle 87′ and land 174 thereon, effect a plurality of flow reversals. Obviously, any number of projections such as 170, 172 and 174 may be utilized.

Now referring to Fig. 9, we see how servo valve 94′ may be used to position actuator piston 96′ by supplying pressure to one side of the piston only. Actuator piston 96′ can be of the half-area type in which a high pressure is supplied through conduit 176 to act against surface 178 of actuator piston 96′. Control pressure $P_{c1}'$ passes through line 120′ to act against surface 180 of actuator piston 96′. The area of surface 180 is substantially twice the size of area 178. Actuator piston 96′ may be utilized to correct the position of any governing means such as throttle valve 100′ in response to a signal error such as temperature error sent to solenoid unit 112′ to reposition floating valve unit 71′, which includes rod 72′ and metering blocks 64′ and 90′ of servo valve 94′ by pivoting link 114′ about pivot point 140′.

Fluid at pressure $P_1'$, is introduced to servo valve 94′ through conduit 116′ and after passing through strainer 182, it passes into chamber 184 from whence it passes through either metering orifice 130′ or metering orifice 62′. The fluid which passes through metering orifice 62′, then passes either through bypass metering orifice 86′ or to conduit 120′ through strainer 186 to provide fluid to surface 180 of actuator valve 96′ at the control pressure $P_{c1}'$. The fluid which passes through metering orifice 86′, then passes through restriction 208 and into cavity 212 for return to sump. In addition to passing through the route already described, the fluid in cavity 184 may also pass through metering orifice 130′, then around metering block 90′, thence through metering orifice 136′ from whence it enters chamber 190 to be turned by flow reverser cap 192 to pass through the interior of tube 72′ in a direction toward solenoid means 112′. After passing through the interior of tube 72′, the fluid is discharged through aperture 210 into cavity 212 from whence it drains through conduit 214 to a fluid sump.

Flow reverser cap 192 causes flow reversal to impart a force on valve unit 71′ to compensate for the "drag effect" imposed on valve 71' by the fluid passing through tubes 72'.

In this fashion, by varying the pressure $P_{c1}'$, in response to the errors transmitted through solenoid unit 112' to servo valve 94', actuating piston 96' is caused to move to compensating positions to actuate throttle 100' to a new position to correct the indicated error.

Spring units 194 and 196 are joined to tube 72' of floating valve unit 71' by some means such as solder shown at 198 and 200 and contain holes 202 and 204 through which tube 72' passes so that the spring elements 194 and 196 serve to suspend valve unit 71' of servo valve 94' in a free floating position.

Spring elements 194 and 196 are biased to push valve unit 71' against spring 250' so that the valve 71' will go to a known position if solenoid unit 112' fails and, further, so that solenoid unit 112' need merely move valve 71' in one direction for compensation purposes since springs 194 and 196 will return the valve.

Fixed wall 206, with aperture 208, therein, may be provided to furnish the same resistance to valve flow from orifice 86' as is provided by the interior of tube 72' by bypass flow from orifice 136' as determined at a reference viscosity.

Restriction 208 may be used to govern the amount of fluid flow to drain and, during periods of valve 94' and servo 96' quiescence, this provides leakage control to maintain this state of quiescence. Such a restriction may also be placed in line 116' to gain the same result. Such restrictions will decrease the valve pressure sensitivity but this may be compensated for by input signal amplification (112') and will also decrease servo horsepower to control the maximum integrating rate of servo 96'.

One of the major advantages of the valve taught herein lies in its flexibility and while innumerable applications will be apparent to those skilled in the art, a few illustrative examples will be given to demonstrate this flexibility.

The servo valve may be used to accomplish "position control" or "position compensation" of regular valve 96, that is, servo valve 94 of Fig. 6 can be utilized to hold actuator valve 96 in quiescence under fluctuations in external load. Assuming that some external force attempts to move actuator valve 96 of Fig. 6 so as to reduce the volume of cavity 122 and increase the volume of cavity 134, this action will cause an increase in pressure $P_{c1}$ and reduce the pressure $P_{c2}$. An increase in pressure $P_{c1}$ will reduce the fluid flow through metering orifice 62 since the pressure drop therethrough is now reduced while the flow through orifice 86 will be increased since the pressure drop therethrough is increased. Increased flow through flow reverser 152 will tend to move shaft 72 of valve unit 71 to rotate bar 114 in a counterclockwise direction to thereby increase the flow through metering orifice 62 while it is decreased through bypass orifice 86 such that a greater flow will be provided to cavity 122 to increase pressure $P_{c1}$, thereby greatly reducing the piston motion from its desired position. The decrease of pressure $P_{c2}$ brought about by the attempted movement of piston 96, just described, will serve to decrease the fluid flow through bypass orifice 136 and thereby decrease the tendency for flow reverser 150 to move valve 71 in a direction to rotate bar 114 in a clockwise direction. This reduction of force complements the simultaneous action which is taking place through flow reverser 152 such that both tend to rotate bar 114 in a counterclockwise direction. The movement of metering block 90 toward the nozzle 131 will cause pressure $P_{c2}$ to reduce to assist actuator piston 96 to move to its original position by reducing the pressure in cavity 134 and increasing the pressure in cavity 122 until actuator piston 96 is in force equilibrium moving very slowly from its original position.

This valve could also be used as throttle valve requiring exceedingly low actuating forces, since, due to compensation, it is not affected by flow forces, especially if the servo valve 94 of Fig. 6 is revamped to delete conduits 132 and 120 and providing a separate conduit like 126 to the engine fuel nozzles, instead of the sump. In short, the fuel entering servo valve 94 through conduit 116 may pass therethrough in throttle valve fashion and then be conducted at a preselected pressure to the engine fuel nozzles by means of a very low actuating force servo valve.

This valve can accomplish temperature compensation by making spring members 194 and 196 and/or springs 250' and 252' of Fig. 9 to be temperature responsive, such as by making spring units 194 and 196 of bi-metallic elements.

This valve, as shown in Fig. 9, could be used as a viscometer. Under these circumstances the resistance to flow through the interior of tube 72' is such that servo valve 94' can be made viscosity sensitive as the pressure in chamber 190 about flow turner 192 varies with viscosity to tend to vary the position of tube 72 and metering blocks 90' and 64'.

It will be further obvious that adjustment for gain compensation can be accomplished by providing means to vary the angle through which flow reversers such as 150 reverse the fluid.

These few examples of valve application are given to demonstrate its flexibility and it should be borne in mind that additional applications will be readily apparent to those skilled in the art.

As has been fully described supra, the valve taught herein attains the advantage of high pressure sensitivity $(dp/dx)$ and gain compensation associated with a spool valve while eliminating the spool valve concentricity problems and inability to achieve maximum pressures. Further, our valve attains the advantages of no friction loss, full closing ability, dirt livability, 90° efflux angle and insensitiveness to changes in momentum forces usually associated with a flapper valve while eliminating the flapper valve problems of sensitivity to pressure drop and static pressure increase as the valve fully closed position is approached.

Although but a few embodiments have been shown and described herein, it will be apparent that various changes and modifications may be made in the construction and arrangement of the various parts without departing from the scope of this novel concept.

We claim:

1. A valve unit comprising at least two coaxial, axially spaced, equal area, cylindrical nozzles, means to pass fluid between said nozzles, a cylindrical metering block having a greater diameter than said nozzles and being coaxial with said nozzles and suspended between said nozzles to form upstream and downstream fluid metering orifices therewith, means to position said block with respect to said nozzles to vary the fluid pressure between said nozzles, and means to balance the static and momentum forces acting on said metering block.

2. A fluid flow valve unit having an axis and comprising at least two axially spaced nozzles, means to pass fluid from one of said nozzles toward the other of said nozzles, a metering block suspended between and extending radially beyond said nozzles to form upstream and downstream fluid metering orifices therewith, and means associated with said metering block to urge said metering block in a direction to decrease the size of said upstream fluid metering orifice with a force proportionate to the rate of fluid flow therethrough.

3. A balanced valve comprising a plurality of coaxial, axially spaced, cylindrical nozzles arranged in pairs, means to direct fluid to pass in the same direction through both nozzles of each of said pairs, a cylindrical metering block coaxial with, projecting radially beyond and positioned between the nozzles of each pair to form an upstream and a downstream fluid metering orifice with said nozzles, means connecting said metering blocks in floating frictionless relation with respect to said nozzle pairs and spacing said metering blocks such that each metering block abuts a nozzle at each end of its travel, and fluid flow reversing means operatively connected to at least one of said metering blocks to cause the size of said fluid metering orifices to vary with the rate of fluid flow.

4. A fluid flow balanced poppet valve having a center and comprising a plurality of coaxial, axially spaced, equal area cylindrical nozzles arranged in pairs and with an equal number of said nozzle pairs on opposite sides of said valve center, a plurality of metering blocks coaxial with said nozzle pairs with one positioned between the nozzles of each pair and projecting radially beyond said nozzles to form fluid metering orifices with said nozzles, means connecting said metering blocks in floating frictionless relation with respect to said nozzle pairs and spacing said metering blocks such that each metering block abuts a nozzle at each end of its travel, and means to pass fluid from the center of the valve in opposite directions such that the fluid flowing in each direction passes through an equal number of nozzles and metering orifices and around an equal number of metering blocks to effect valve balance.

5. A balanced fluid flow poppet valve including a stationary member comprising an outer housing with an axis and an axial center, a plurality of radially extending walls forming a plurality of cavities with said housing such that an equal number of cavities is located on each side of said axial center, and a plurality of equal area cylindrical nozzles each positioned by one of said walls to be coaxial with the remainder of said nozzles and arranged in pairs such that a pair of nozzles is located one each in opposite walls of one of said cavities and further such that the nozzles of each pair and the nozzle pairs are equally spaced axially, a floating valve unit comprising a plurality of metering blocks with one located between the nozzles of each of said nozzle pairs, and extending radially beyond said nozzles to form metering orifices therewith, said metering blocks being spaced such that each abuts a nozzle at each end of its travel, means connecting said metering blocks for simultaneous frictionless movement, means to pass fluid in opposite directions through said valve from said stationary member outer housing axial center such that the fluid passing in each direction passes through an equal number of nozzles, metering orifices and cavities and around an equal number of metering blocks, and means associated with said floating valve unit to impose a force thereon toward one of said nozzles proportionate to the rate of fluid flow.

6. A balanced fluid flow valve having an inlet and an outlet and including a stationary member comprising an outer housing with an axis and an axial center, a plurality of radially extending walls forming a plurality of cavities with said housing such that an equal number of cavities is located on each side of said axial center, and a plurality of cylindrical nozzles each positioned by one of a said walls to be coaxial with the remainder of said nozzles and arranged in pairs such that a pair of nozzles is located one each in opposite walls of one of said cavities and further such that the nozzles of each pair and the nozzle pairs are equally spaced axially, a floating valve unit comprising a plurality of metering blocks with one located between the nozzles of each of said nozzle pairs and extending radially beyond said nozzles to form metering orifices therewith, said metering blocks being spaced such that each abuts a nozzle at each end of its travel to effect gain control, means connecting said metering blocks for simultaneous frictionless movement, means for passing fluid in two paths from said inlet to said outlet such that the fluid following each path flows through an equal number of said nozzles and said metering orifices and around an equal number of metering blocks to effect valve balance by a cancellation of static and momentum fluid forces, and a servo piston-cylinder unit responsive to the fluid pressures in said cavities and having cylinder enclosed chambers on opposite sides of said piston each in communication with a cavity in a different one of said two fluid flow paths such that said floating valve unit will move to different balanced positions to compensate for servo leakage across said servo piston.

7. A balanced fluid flow valve having an inlet and an outlet and including a stationary member comprising an outer housing with an axis and an axial center, a plurality of radially extending walls forming a plurality of cavities with said housing such that an equal number of cavities is located on each side of said axial center, and a plurality of equal area cylindrical nozzles each positioned by one of said walls to be coaxial with the remainder of said nozzles and arranged in pairs such that a pair of nozzles is located one each in opposite walls of one of said cavities and further such that the nozzles of each pair and the nozzle pairs are equally spaced axially, a floating valve unit comprising a plurality of metering blocks with one located between the nozzles of each of said nozzle pairs and extending radially beyond said nozzles to form metering orifices therewith, said metering blocks being spaced such that each abuts a nozzle at each end of its travel to effect gain control, means connecting said metering blocks for simultaneous frictionless movement, means for passing fluid in two paths from said inlet to said outlet such that the fluid following each path flows through an equal number of said nozzles and said metering orifices and around an equal number of metering blocks to effect valve balance by a cancellation of static and momentum fluid forces, and a servo piston-cylinder unit responsive to the fluid pressures in said cavities and having cylinder enclosed chambers on opposite sides of said piston each in communication with a cavity in a different one of said two fluid flow paths, and error sensing means positioning said floating valve unit with respect to said stationary member to vary the fluid pressures in said cavities and chambers to actuate said servo to correct the error, said servo piston-cylinder unit being large with respect to said balanced fluid flow valve so that said metering blocks need not abut said nozzles to correct the error sensed by said error sensing means during normal operation.

8. A balanced fluid flow valve having an inlet and an outlet and including a stationary member comprising an outer housing with an axis and an axial center, a plurality of radially extending walls forming a plurality of cavities with said housing such that an equal number of cavities is located on each side of said axial center, and a plurality of cylindrical nozzles each positioned by one of said walls to be coaxial with the remainder of said nozzles and arranged in pairs such that a pair of nozzles is located one each in opposite walls of one of said cavities and further such that the nozzles of each pair and the nozzle pairs are equally spaced axially, a floating valve unit comprising a plurality of metering blocks with one located between the nozzles of each of said nozzle pairs and extending radially beyond said nozzles to form metering orifices therewith, said metering blocks being spaced such that each abuts a nozzle at each end of its travel to effect gain control, means connecting said metering blocks for simultaneous frictionless movement, means for passing fluid in two paths from said inlet to said outlet such that the fluid following each path flows through an equal number of said nozzles and said metering orifices and around an equal number of metering blocks to effect valve balance by a cancellation of static and momentum fluid forces, a servo piston unit responsive to the differential between the fluid pressure in two of said cavities on opposite sides of said axial center, and flow reversers operatively connected to said floating valve unit with one in each of said two paths to impose complementary forces on said floating unit proportionate to fluid flow therethrough to move it with respect to said stationary member to vary said valve fluid pressure to maintain the velocity of said servo unit constant without respect to the loads thereon.

9. A balanced flow controlling valve having an axis and comprising a plurality of axially spaced nozzles arranged in pairs, said flow passing from one nozzle of each pair into the other nozzle of the respective pair, a floating valve unit including a metering block for each nozzle pair positioned in floating relation between the nozzles of its respective pair and projecting radially beyond said nozzles to form fluid metering orifices and a hollow tube connecting said metering blocks for simultaneous movement and extending therebeyond and a flow reverser unit at one end of said tube, and means to pass fluid in two oppositely directed flow paths through said valve such that the fluid flowing through each flow path passes through an equal number of nozzles and metering orifices and such that the flow through one of said paths is turned by said flow reverser and passed through the interior of said hollow tube with the flow reversing effect balancing the fluid drag effect on the interior of said hollow tube, and means positioned to receive and collect valve fluid and in axial communication with said valve unit so that said valve unit will displace valve fluid in moving axially thereby causing the position of said metering blocks relative to said nozzles to be fluid viscosity sensitive.

10. A balanced fluid flow valve including a stationary member comprising an outer housing with an axis and an axial center, a plurality of radially extending walls forming a plurality of cavities with said housing such that an equal number of cavities is located on each side of said axial center, and a plurality of equal area cylindrical nozzles having a thin wall of approximately five units each positioned by one of said walls to be coaxial with the remainder of said nozzles and arranged in pairs such that a pair of nozzles is located one each in opposite walls of one of said cavities and further such that the nozzles of each pair and the nozzle pairs are equally spaced axially, a floating valve unit having an axial travel of about ten units comprising a plurality of metering blocks with one located between the nozzles of each of said nozzle pairs and extending radially beyond said nozzles to form metering orifices therewith with efflux and influx angles of about 90°, said metering blocks being spaced such that each abuts a nozzle at each end of its travel, a tube connecting said metering blocks for simultaneous movement and being of such size that the area between said nozzles and said tube is greater than the total axial movement of said floating valve unit, means to limit the movement of said floating unit such that a minimum gap of approximately three units is maintained between said metering blocks and said nozzles.

References Cited in the file of this patent

UNITED STATES PATENTS

| | | |
|---|---|---|
| 2,621,676 | Loft | Dec. 16, 1952 |
| 2,708,948 | Segerstad | May 24, 1955 |
| 2,732,860 | Ray | Jan. 31, 1956 |
| 2,739,613 | Kulikoff | Mar. 27, 1956 |
| 2,746,424 | Segerstad et al. | May 22, 1956 |
| 2,747,612 | Lee | May 29, 1956 |
| 2,754,843 | Hauber | July 17, 1956 |
| 2,765,378 | Perry | Oct. 2, 1956 |
| 2,812,775 | Hodgson | Nov. 12, 1957 |
| 2,833,308 | Berry | May 6, 1958 |
| 2,839,079 | Holmes | June 17, 1958 |
| 2,875,784 | Cole | Mar. 3, 1959 |

FOREIGN PATENTS

| | | |
|---|---|---|
| 708,071 | France | Apr. 18, 1935 |